United States Patent [19]

Edwards et al.

[11] Patent Number: 5,667,917
[45] Date of Patent: Sep. 16, 1997

[54] ELECTRODE WITH CONDUCTIVE FILLERS

[75] Inventors: Dean B. Edwards; Philip W. Appel, both of Moscow, Id.

[73] Assignee: Idaho Research Foundation, Moscow, Id.

[21] Appl. No.: 436,903

[22] Filed: May 8, 1995

Related U.S. Application Data

[63] Continuation of Ser. No. 938,616, Sep. 1, 1992, abandoned, which is a continuation-in-part of Ser. No. 759,187, Sep. 10, 1991, abandoned.

[51] Int. Cl.$^6$ .................................................. H01M 4/56
[52] U.S. Cl. ........................... 429/228; 429/232; 429/225
[58] Field of Search ................................... 429/228, 232, 429/225

[56] References Cited

U.S. PATENT DOCUMENTS

| | | | |
|---|---|---|---|
| 1,240,076 | 9/1917 | Mears | 429/241 |
| 1,347,873 | 7/1920 | Rabe | 429/239 |
| 1,685,215 | 9/1928 | Davis | 429/241 |
| 2,234,732 | 3/1941 | Haunz | 136/53 |
| 2,634,304 | 4/1953 | Stoertz | 136/39 |
| 3,447,969 | 6/1969 | Tudor et al. | 136/262 |
| 3,466,193 | 9/1969 | Hughel | 136/26 |
| 3,751,301 | 8/1973 | Kilduff | 136/26 |
| 3,973,991 | 8/1976 | Cestaro et al. | 136/26 |
| 4,039,730 | 8/1977 | Brinkmann et al. | 429/212 |
| 4,151,331 | 4/1979 | Hug et al. | 429/94 |
| 4,158,085 | 6/1979 | Bilhorn | 429/130 |
| 4,276,110 | 6/1981 | Bilhorn | 156/298 |
| 4,487,792 | 12/1984 | Hartmann | 428/105 |
| 4,507,372 | 3/1985 | Rowlette | 429/228 |
| 4,546,053 | 10/1985 | Sundberg | 429/57 |
| 4,654,281 | 3/1987 | Anderman et al. | 429/209 |
| 4,687,719 | 8/1987 | Benda et al. | 429/234 |
| 4,873,161 | 10/1989 | Rippel et al. | 429/225 |
| 5,223,352 | 6/1993 | Pitts et al. | 429/225 |

FOREIGN PATENT DOCUMENTS

| | | |
|---|---|---|
| 35 32 697 A1 | 3/1988 | Germany . |
| 51-5488 | 5/1967 | Japan . |
| 50-33424 | 3/1975 | Japan . |
| 55-66865 | 10/1978 | Japan . |
| 55-108175 | 11/1985 | Japan . |
| 62-160659 | 7/1987 | Japan . |

OTHER PUBLICATIONS

1991 Article by Edwards, et al., Evaluation of Hollow, Glass Microspheres Used As An Additive In Positive, Lead/Acid Battery Paste, *Journal of Power Sources*, 34, 217–232, 1992.

1992 Article by Edwards, et al., Evaluation of Hollow, Glass Microspheres Used As An Additive In Negative, Lead/Acid Battery Paste, *Journal of Power Sources*, 38, 287–294, 1991.

1992 Article by Edwards, et al., Conductivity Model for Lead/Acid Battery Electrodes Discharged at Low Rates, *Journal of Power Sources*, 38, 281–286, 1992.

*Primary Examiner*—Samuel Barts
*Attorney, Agent, or Firm*—Leydig, Voit & Mayer, Ltd.

[57] ABSTRACT

An electrode for a lead-acid battery comprising a current collector and active material carried by said current collector wherein the active material includes a conductive filler or a mixture of conductive and non-conductive fillers such that the utilization of active material is greater than 35% at the one hour rate. In addition, the active material may form multilayers wherein the several layers of the multilayers may contain varying amounts of fillers either conductive or non-conductive.

33 Claims, 1 Drawing Sheet

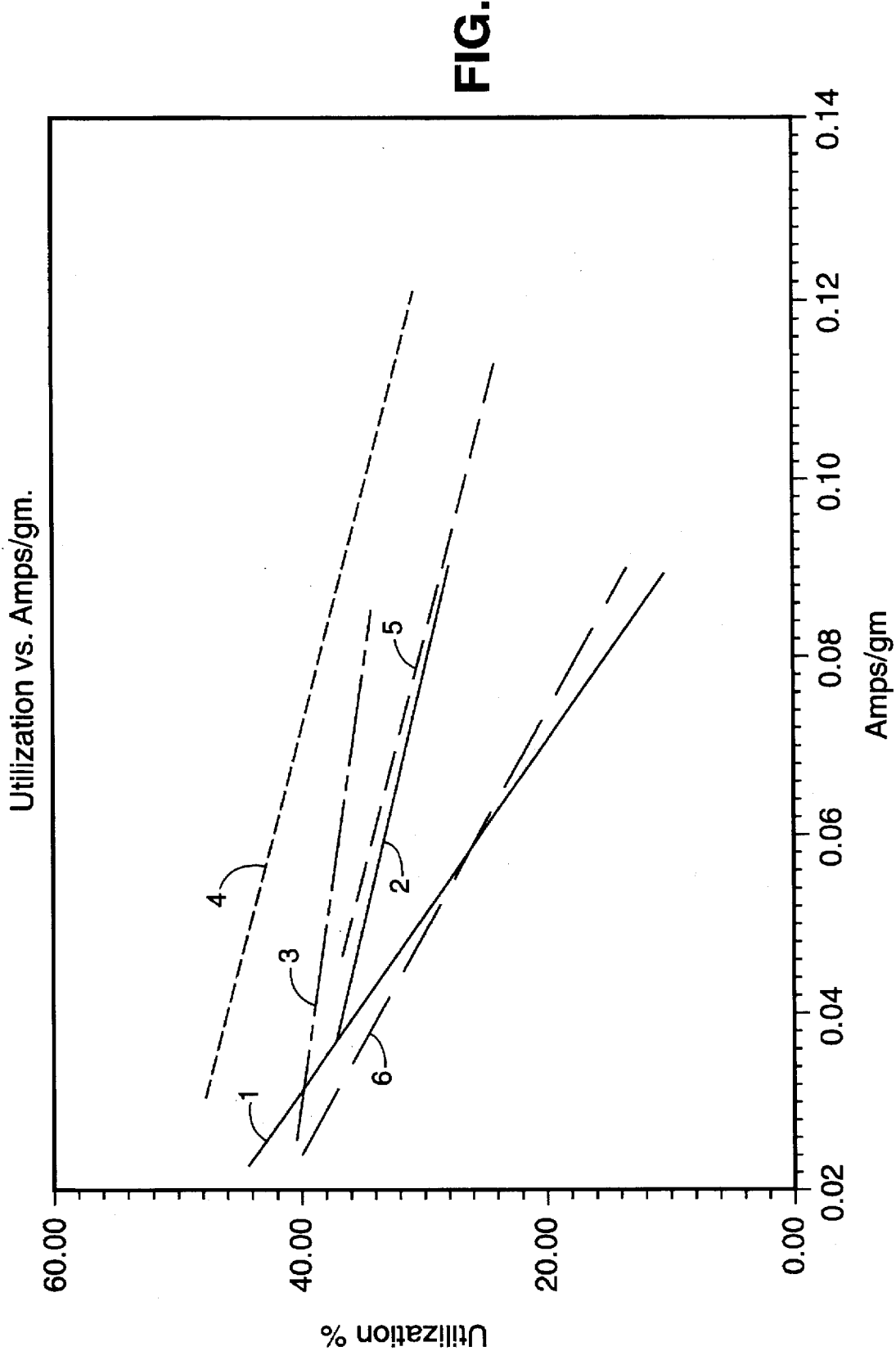

ELECTRODE WITH CONDUCTIVE FILLERS

This is a continuation of application(s) Ser. No. 07/938,616 filed on Sep. 1, 1992, now abandoned, which is a continuation-in-part of U.S. application Ser. No. 07/759,187, filed Sep. 10, 1991, now abandoned.

BACKGROUND OF THE INVENTION

1. Field of the Invention

The present invention relates to storage batteries, and, more particularly, to a novel lightweight electrode having improved power and energy performance for use in storage batteries and to a novel electrode and storage battery having both improved utilization and conductivity.

2. Description of the Prior Art

Despite considerable study of alternative electrochemical systems, the lead-acid battery is still the battery-of-choice for general purpose uses such as starting a vehicle, boat or airplane engine, emergency lighting, electric vehicle motive power, energy buffer storage for solar-electric energy, and field hardware whether industrial or military.

The conventional lead-acid battery is a multicell structure. Each cell contains a plurality of positive and negative plates formed of lead-based alloy grids containing layers of electrochemically active pastes. The paste on the positive plate when charged contains lead dioxide which is the positive active material and the negative plates contain a negative active material such as sponge lead. The lead-acid battery has been widely used in the automotive industry for many years and there is substantial experience and tooling in place for manufacturing this battery and its components. The lead-acid battery is based on readily available materials, is inexpensive to manufacture and is widely accepted by consumers.

There are inherent disadvantages to the lead-acid battery. During discharge of the lead-acid battery, the lead dioxide (a fairly good conductor) in the positive plate is converted to lead sulfate, an insulator. The lead sulfate can form an impervious layer encapsulating the lead dioxide particles which limits the utilization of lead dioxide to less than 50 percent of capacity, typically around 30 percent. The power output is significantly influenced by the state-of-discharge of the battery, since the lead sulfate provides a circuit resistance whenever the battery is under load. Furthermore, the lead sulfate can grow into large, hard, angular crystals, disrupting the layer of paste on the grid resulting in flaking and shedding of active material from the grid. Power consumption during charge is also increased due to the presence of the lead sulfate insulator. The lead sulfate crystals in the negative electrode can grow to a large, hard condition and, due to their insulating characteristics, are difficult to reduce to lead. Even when very thin pastes are utilized, the coating of insulating lead sulfate interferes with power output. Thus, power capability is greatly influenced by the state-of-charge of the battery.

The power and energy performance of the lead-acid battery is inherently less than optimum because most of the active material does not react in the electrochemical cycle of the battery. The active material that does not react during discharge may be viewed as dead weight which undesirably increases the weight of the battery and concomitantly decreases the energy-to-weight ratio and power-to-weight ratio of the battery. However, the active material that does not react does provide structure and conductivity for the active material that does react.

The positive plate of the lead-acid battery is the plate that normally fails in a deep cycle application. As a battery is cycled, the positive paste softens and eventually causes the battery to fail. Failure can occur in a number of ways. As the paste softens, it can lose contact with the plate and become inactive. This reduces the capacity of the battery and eventually leads to battery failure. If the softened active material falls to the bottom of the battery and bridges the gap between a positive and negative plate, the battery will fail from short circuiting.

The softening of the active material also exposes the grid to more sulfuric acid. This accelerates grid corrosion and can produce an insulating layer on the grid which prevents the active material from being in good electrical contact with the grid. In this case, the battery would fail as a result of an interface problem between the grid and active material. Grid corrosion also produces grid growth which separates the grid from the positive active material. In this case, the battery will lose capacity and eventually fail. The major problem associated with extending the life of lead-acid batteries is maintaining the integrity of the positive plate while it is cycled.

The porosity of the electrode has been recognized as essential for the discharge of the electrode so that the electrolyte is available for the chemical reaction during discharge. Attempts have been made to include in the electrode various non-conductive fillers to increase the porosity of the plates. For example, in Offenlegungsschrift DE 3631738A1 the electrode pore volume is said to be raised by the addition of non-conductive fillers in the form of micro hollow beads of glass, whose walls are made porous by etching, micro capsules of polymer or copolymers of organic materials, such as polyethylene or polypropylene which are formed as a three-quarter sphere, or hollow fibers. It is also recognized that increasing the pore volume of the electrode with these fillers reduces the conductivity of the active material. The reduction in conductivity is said to be compensated by the addition of conductive fillers, such as carbon or carbon fibers.

Japanese Patent Application No. 55-66865 discusses mixing hollow microspheres such as armosphere, philite, shirar ballons, silica ballons, and carbon ballons into the active material of the electrode to improve the discharge characteristics of the electrode.

Japanese Patent Application No. 55-108175 discusses mixing hollow microbodies as a component of the active material. The hollow microbodies are resistant to the acid in the electrolyte and form multiporous structures. The microbodies are hollow and include shells joined to cavities filled with electrolyte. The cavities are joined to the region of the plate that participates in the charging reaction.

Japanese Patent Application No. 62-160659 discusses the inclusion of hollow carbon ballons into the active material of the plate.

Another problem associated with lead-acid batteries is that the electrical conductivity for a discharged or sulphated plate is very low. Discharged portions of the plate can act to electrically isolate and prevent other portions of the plate from either charging or discharging. The utilization of the plate's active material during a discharge is reduced as a result of this electrical isolation.

Conductive fillers have been suggested for addition to the paste to improve conductivity. For example, it has been attempted to increase the conductivity of the paste by adding a conductive filler such as graphite, carbon and carbon fibers.

Graphite has been used successfully as a conductive filler in other electrochemical cells, such as in the manganese dioxide positive active paste of the common carbon-zinc cell, and mixed with the sulfur in sodium-sulfur cells. However, even though graphite is usually a fairly inert material, it is oxidized in the aggressive electrochemical environment of the lead-acid cell to acetic acid. The acetate ions combine with the lead ion to form lead acetate, a weak salt readily soluble in the sulfuric acid electrolyte. This reaction depletes the active material from the paste and ties up the lead as a salt which does not contribute to production and storage of electricity. Highly conductive metals such as copper or silver are not capable of withstanding the high potential and strong acid environment present at the positive plate of a lead-acid battery. A few electrochemically-inert metals such as platinum are reasonably stable. But the scarcity and high cost of such metals prevents their use in high volume commercial applications such as the lead-acid battery. Platinum would be a poor choice even if it could be afforded, because of its low gassing over potentials.

Hughel (U.S. Pat. No. 3,466,197) discloses the addition of 5–25 percent by weight of lead fibers to the positive paste of a deep-cycle lead-acid battery. Hughel also added 0.1 to 1 percent by weight of non-conductive polymeric fibers to increase the strength of the plates. The presence of non-conductive fibers increases bulk and weight and reduces efficiency of the plates. Furthermore, lead fibers are subject to significant stress corrosion during charge-recharge cycling. Pure lead fibers contain microcracks. Stress corrosion starts at the microcrack and continues until the fiber is consumed and loses its reinforcement function. It is very difficult to manufacture pure lead fibers without microcracking. Hughel suggests strengthening a conductive latticework by use of a tissue of lead coated glass fibers. However, no lead coated wire existed with the requisite reinforcement coating and adequate strength.

Rowlette (U.S. Pat. No. 4,507,372) discloses adding $SnO_2$ coated glass fibers to a positive paste to maintain conductivity during charge and discharge. Again, there is an increase in bulk and loss of capacity since lead oxide is displaced with the tin oxide coated glass.

Despite the considerable effort of those skilled in the battery art to address the inherent problems of electrolyte diffusion throughout the plates and electronic conductivity of the active material in electrochemical cells, and, in particular, in a lead-acid storage battery, the art has failed to provide a solution to the long-standing problem of providing a lead-acid storage battery which satisfactorily addresses both problems at the same time in a cell to provide a lead-acid battery having improved energy-to-weight performance and high utilization at high rates of discharge. There also has been a long-standing and unsolved need for lightweight lead-acid batteries having sufficient utilization for use in the power sources of electric vehicles.

Thus, there still remains a need for an improved strong, non-corrosive electrode that is lighter in weight than a conventional electrode and that exhibits improved conductivity and utilization, and to batteries made therefrom which are especially suited for electric vehicles.

Accordingly, it is a principal object of the present invention to provide a strong, lightweight, non-corrosive electrode. It is a related object to provide such an electrode in which the active material in the plate that does not react electrochemically but provides structure and conductivity to the plate is replaced with a lightweight material that provides structure and in which there is high utilization at high rates of discharge.

It is another object of the invention to provide an electrode with improved power and energy performance. A further and related object is to provide an electrode which provides improved utilization of the active material and yet is lighter in weight than conventional electrodes.

It is yet another object of the invention to provide an electrode and storage battery having both improved utilization of the active material of the electrode and improved electronic conductivity in the electrode.

It is a specific object of the present invention to provide an electrode for a lead-acid battery which reduces the amount of active material in the electrode without compromising strength and performance. It is yet another object of the invention to provide a lead-acid battery where utilization is at least about 35% based on the one hour discharge rate.

It is a further, more specific object of the present invention to provide a lead-acid battery suitable for use in the power source of electric vehicles.

These and other objects and advantages of the present invention will become apparent from the following detailed description.

SUMMARY OF THE INVENTION

The present invention is predicated on the discovery that both electrolyte diffusion in the plates and the electronic conductivity of the active material within the lead-acid electrode and therefore in a lead-acid cell or battery, can be properly controlled to improve the energy-to-weight performance and the utilization of a lead-acid battery. Suitable fillers are incorporated into the active material of an electrode to replace active material in the plate that does not react electrochemically but which is present in the plate for structure and conductivity to provide an electrode lighter in weight than a comparable conventional electrode. Conductive fillers or a combination of conductive and non-conductive fillers may be used in order to improve the diffusion of electrolyte in the plates and to improve the electronic conductivity of the active material and thereby improve both the performance of the cell or battery and the utilization of active material. With the batteries made in accordance with this invention, utilization of greater than 35% at the one hour rate may be achieved. Heretofore, utilization above 35% was not practical. Medium and high rate capacity can be improved by increasing the porosity of the plates. Increased porosity can be achieved by the use of fillers capable of storing electrolyte.

Thus, in one aspect, the present invention provides an electrode which includes a current collector and an active material carried by the current collector and wherein the active material includes conductive fillers, such as hollow glass microspheres, incorporated into the active material to improve the energy-to-weight performance and the utilization. The glass microspheres may be inherently conductive, having been made using materials that are electrically conductive, or they may be coated. When the microspheres are coated, they are coated with a conductive medium to improve their conductivity and the conductivity of the electrode. The invention further provides an electrode which includes both conductive and non-conductive fillers, used in combination to improve both electrolyte diffusion and conductivity while achieving a utilization greater than 35% at the one hour rate.

In another aspect, the present invention provides a storage battery or cell which includes at least one electrode having either conductive fillers or both conductive and non-conductive fillers incorporated in the active material.

In yet another, more specific aspect, the invention provides a lead-acid cell or battery which includes at least one electrode having either conductive fillers or both conductive and non-conductive fillers incorporated in the active material such that the energy-to-weight performance and utilization of active material of the battery is improved.

BRIEF DESCRIPTION OF THE DRAWINGS

FIG. 1 shows the per cent utilization of plates both without glass microspheres and with glass microspheres in various amounts.

DETAILED DESCRIPTION OF THE PREFERRED EMBODIMENTS

While the invention will be described in connection with the preferred embodiment, it will be understood that it is not so limited. On the contrary, the invention is intended to cover all alternatives, modifications, and equivalents of the novel electrode defined by the appended claims. By way of illustration, the invention will be described in connection with a lead-acid battery.

The present invention provides a novel lightweight electrode for use in electrochemical systems such as storage batteries and cells, and to storage batteries and cells which include the novel electrode.

As is conventional, the electrode comprises a current collector and active material carried by the current collector for carrying out the electrochemical reaction for the particular type of battery or cell. Thus, for example, for a lead-acid battery or cell the current collector may be a grid of well-known design to those skilled in the art. By way of illustration, the grid may comprise a frame having grid wires attached to the sides, the top, and the bottom of the frame. The grid wires may form a trapezoidal shape in order to provide better mechanical locking of the paste in place. Further, by way of illustration, the frames may take other forms, such as an expanded metal grid, a fluid impervious sheet for forming a monopolar or bipolar plate or a conductive resin frame or thin profile frame for use in high performance batteries. The grid may be composed of lead or lead alloys with metals such as antimony, tin, calcium, and the like.

In a lead-acid battery or cell, the active material may be conventional, that is, sponge lead for the negative electrode and lead dioxide for the positive plate. As is well known to those skilled in the art, the active material for both the positive plate and the negative plate is made from a paste mixture which is subsequently applied to the grid. After the plates have been cured, formation, or charging converts the inert paste into active material, and thereby converts the plates into active plates, i.e., electrodes. The paste for the positive plate is formed from lead oxide which is mixed with sulfuric acid and water. Red lead may be added to aid in the formation step. The paste for the negative plate is formed from lead oxide which is mixed with sulfuric acid and water, and may, in addition, include expanders in order to prevent contraction and solidification of the sponge lead and the consequent loss of capacity and life of the finished battery.

In accordance with the present invention conductive fillers, or a combination of conductive fillers and non-conductive fillers, are provided as an integral part of the active material of the electrode. The fillers reduce the amount of active material used in the electrode. The weight of the plate is also reduced because the fillers, such as conductive and non-conductive hollow glass microspheres, are much lower in density than the active material. The fillers, including the glass microspheres, also provide structural strength to the plate because of their high strength-to-weight ratio. Accordingly, the strength of the plate is not compromised by the substitution of glass microspheres for the active material. Further, while the plate will weigh less, its performance will not be compromised because the amount of active material necessary for the electrochemical reaction is provided and excess active material that does not enter into the electrochemical reaction but which is otherwise present for structural integrity is eliminated. It will be appreciated by those skilled in the art that fillers such as hollow glass microspheres may be used in both positive and negative electrodes and plates with equal facility.

In an electrode or plate for a lead-acid cell or battery, the fillers, such as hollow glass microspheres, reduce the amount of lead, and lead oxide active material in the negative and positive plates, respectively. Such plates are lighter in weight than conventional plates owing to the substitution of the low density fillers such as hollow glass microspheres for the comparatively higher density lead and lead dioxide active material. Plates made in accordance with the present invention are structurally strong and have comparable, or even improved performance in terms of energy-to-weight and power to weight ratios of the battery or cell.

The inclusion of fillers in the active material of the plate allows the electrolyte diffusion in the plate and the electronic conductivity of the plate to be controlled so that the utilization of active material is also improved. The control of electrolyte diffusion and electronic conductivity provides active material utilization (amp-hr/gm) higher than the utilization of conventional active material without the fillers. Active material utilization of electrodes in accordance with the present invention is greater than 35% at the one hour discharge rate. Even higher active material utilization, such as on the order of about 70% or so may be achieved. Further, it is expected that the plates will have a satisfactorily long cycle life because of the structural support to the active material provided by the fillers, especially glass microspheres.

The conductive fillers suitable for use in the present invention include fillers that are electrically conductive and fillers that are chemically and physically compatible with the electrochemical environment of the lead-acid cell or battery. Suitable conductive fillers include graphite fibers, hollow lead glass microspheres, hollow coated glass microspheres, titanium, titanium oxide such as Ebonex®, stannic oxide and the like. The hollow coated glass microspheres are coated with a conducting medium to enhance the conductivity of the electrode. The coating medium should be electrically conductive and it must be electrochemically compatible in the lead-acid environment in which the coated glass microsphere is used; that is, in either the environment of the positive plate or the environment of the negative plate. Suitable conducting media include metals such as lead, zinc, tin, gold, cobalt, uranium, platinum, zirconium, titanium, tellurium, nickel, tantalum, hafnium, niobium, tungsten, chromium, magnesium and the like, electrically conductive metal oxides, such as titanium oxide, zirconium oxide, lead oxide, tin oxide and the like, and electrically conductive metal alloys. The glass microspheres are typically coated with a thin film of the metal, metal alloy, or metal oxide.

Non-conductive fillers suitable for use in the present invention include non-conductive glass microspheres, peralite, diatomaceous earth, and other inert fillers. The non-conductive filler may also comprise an anion exchange resin. The anion exchange resin can be used as an additional source of sulfate anion for the electrochemical reaction in the lead-acid battery.

The size of the hollow glass microspheres suitable for use in the present invention is not particularly critical, as long as the microspheres can be admixed with the powder or paste used to fabricate the electrode. Preferably the glass microspheres are unicellular. Generally, the glass microspheres which have been found useful have an average diameter of from about 20 microns to about 500 microns, and preferably of from about 20 microns to about 100 microns. Glass microspheres having a diameter of about 50 microns are preferred.

The volume of filler, measured as a percent of the total volume of active material plus filler on the plate, whether conductive, or a mixture of conductive and non-conductive fillers that is included in the active material of the electrode or plate in accordance with the invention will depend, in part, on the final weight desired for the electrode in view of the end use performance requirements for the battery or cell. In keeping with the invention, the volume of filler used will be selected so that electrolyte diffusion and electronic conductivity are controlled to achieve satisfactory utilization of the active material. Typically, the volume of filler is selected to achieve at least 35% utilization at the one hour rate. When a conductive filler, such as hollow lead glass microspheres is used, the conductive filler should be included in the active material in an amount of from about 15% to about 65% by volume, preferably, from about 25% to about 50% by volume. For hollow lead glass microspheres, the most preferred amount is from about 30% to about 40% by volume. When a mixture of conductive filler such as graphite fibers and non-conductive filler such as hollow glass microspheres is used, the conductive filler should be included in the active material in an amount of from about 15% to about 65% by volume, preferably from about 25% to about 50% by volume and more preferably from about 30% to about 40% by volume, while the non-conductive filler should be included in an amount from about 10% to about 50% by volume, preferably from about 20% to about 40% by volume, and more preferably from about 25% to about 35% by volume to achieve the desired utilization. Preferably the ratio of conductive filler to non-conductive is 2:1, up to about 50% by volume of total filler. It will be appreciated that the amount of conductive filler included in the active material may vary depending on the particle size of the conductive filler. Generally, the amount of filler needed will depend on the dispersion of the particles throughout the active material. Smaller particles generally may be dispersed better than larger particles so less of the smaller particles may be needed to accomplish the desired utilization than if larger particles are used. At the higher loading of glass microspheres there is sufficient active material to support the requisite electrochemical reaction and the conductivity of the plate is satisfactory.

In order to fabricate the paste for a plate for use in a lead-acid battery or cell it is preferable to first dry mix the lead, lead oxide and glass microspheres together. Subsequently water and sulfuric acid electrolyte are added to the dry mix. When carrying out this paste fabrication process it has been found, surprisingly, that the glass microspheres do not float out of the dry mixture when the water and sulfuric acid are added, despite the large difference in density between the glass microspheres and the paste.

The novel electrodes of the present invention are capable of various configurations. For example, and by way of illustration and not in limitation, an electrode having glass microspheres may be configured in a multiple-layer structure. The central or core layer may comprise an active material having glass microspheres incorporated therein and layers of conventional paste may be added to the core layer. In such a configuration, the outside layers would exhibit high utilization of active material, and the core layer would provide the structure and conductivity for the outside layers.

EXAMPLE

Positive electrodes with different amounts of hollow glass microspheres were prepared and tested for utilization at a given current to weight ratio (amps/gm), and compared to hand pasted electrodes with no glass microspheres and with a conventional commercially available electrode (also without glass microspheres). All the positive electrodes were made from 4⅛"×4¼" plates, and had a nominal thickness of 0.087". The grids, 0.077" thick, were made from a conventional lead-antimony alloy of about 3–5% antimony. The paste was a conventional paste formed from a typical lead/lead oxide mix, 1.4 sp. gr. sulfuric acid and water. The paste mix for paste which did not contain glass microspheres was 30 ml 1.4 sp. gr. sulfuric acid and 50 ml water per pound of lead/lead oxide mix. When glass microspheres were added to the paste, it was found that additional water was needed in order to form a pastable mixture. The amount of additional water needed in the paste is proportional to the amount of glass microspheres added. For each of Electrode Nos. 2–5 identified in Table I below, the amount of water added was that amount sufficient to provide the paste density set forth. The amount of glass microspheres per pound of lead oxide, paste density, paste weight and total electrode weight, i.e., plate weight, for the different electrodes are set forth below:

TABLE I

| Electrode No. | Amount of Glass Microspheres (gm) | Paste Density (gms/in³) | Paste Wt. (gms) | Plate Wt. (gms) |
|---|---|---|---|---|
| 1. (No glass (bubbles) | 0 | 70 | 77 | 130 |
| 2. | 5 | 55 | 62 | 115 |
| 3. | 10 | 50 | 58 | 111 |
| 4. | 20 | 34 | 37 | 90 |
| 5. | 30 | 29 | 43 | 96 |
| 6. Conventional Commercial positive plate | 0 | — | — | — |

Three electrodes having the characteristics of Electrode No. 1 identified in Table I were made and tested. Two electrodes having the characteristics of Electrode Nos. 2–5 identified in Table I were made and tested. One conventional commercial positive plate, identified in Table I as Electrode No. 6 was tested. The amps/gm and per cent utilization for each of these electrodes is set forth in Table II below. An amps/gm of 0.06 to 0.07 is the one hour discharge rate.

TABLE II

| Amps/gm | Utilization (%) |
|---|---|
| Electrode No. 1 | |
| A | |
| 0.023 | 46.50 |
| 0.023 | 45.68 |
| 0.023 | 46.24 |
| 0.028 | 42.75 |
| 0.028 | 40.90 |

TABLE II-continued

| Amps/gm | Utilization (%) |
|---|---|
| 0.028 | 46.24 |
| 0.039 | 44.26 |
| 0.039 | 41.28 |
| 0.039 | 39.76 |
| 0.057 | 37.43 |
| 0.057 | 38.24 |
| 0.057 | 39.96 |
| B | |
| 0.020 | 44.90 |
| 0.020 | 44.60 |
| 0.020 | 45.00 |
| 0.040 | 39.52 |
| 0.040 | 36.22 |
| 0.040 | 35.76 |
| 0.060 | 30.17 |
| 0.060 | 26.57 |
| 0.060 | 27.50 |
| 0.080 | 19.12 |
| 0.080 | 16.55 |
| 0.080 | 16.21 |
| 0.100 | 7.8 |
| 0.100 | 7.3 |
| 0.100 | 7.8 |
| C | |
| 0.020 | 35.76 |
| 0.020 | 35.39 |
| 0.020 | 35.89 |
| 0.040 | 31.68 |
| 0.040 | 26.36 |
| 0.040 | 27.20 |
| 0.060 | 18.10 |
| 0.060 | 15.70 |
| 0.060 | 16.10 |
| 0.080 | 10.1 |
| 0.080 | 8.9 |
| 0.080 | 10.71 |
| 0.100 | 3.46 |
| 0.100 | 1.79 |
| 0.100 | 1.98 |
| Electrode No. 2 | |
| A | |
| 0.037 | 34.96 |
| 0.037 | 38.58 |
| 0.037 | 39.37 |
| 0.046 | 31.61 |
| 0.046 | 34.55 |
| 0.046 | 33.49 |
| 0.063 | 34.80 |
| 0.063 | 35.29 |
| 0.063 | 35.86 |
| 0.090 | 24.59 |
| 0.090 | 27.53 |
| 0.090 | 29.16 |
| B | |
| 0.033 | 31.20 |
| 0.033 | 29.56 |
| 0.033 | 33.25 |
| 0.042 | 29.8 |
| 0.042 | 31.3 |
| 0.042 | 31.9 |
| 0.060 | 27.5 |
| 0.060 | 32.10 |
| 0.060 | 29.50 |
| 0.085 | 22.15 |
| 0.085 | 24.14 |
| 0.085 | 19.86 |
| Electrode No. 3 | |
| A | |
| 0.035 | 38.37 |
| 0.035 | 44.0 |
| 0.035 | 44.24 |
| 0.042 | 32.10 |
| 0.042 | 36.33 |
| 0.042 | 39.15 |
| 0.061 | 42.25 |
| 0.061 | 41.74 |
| 0.061 | 38.70 |
| 0.088 | 31.20 |
| 0.088 | 33.80 |
| 0.088 | 32.10 |
| B | |
| 0.035 | 36.49 |
| 0.035 | 35.70 |
| 0.035 | 36.33 |
| 0.044 | 36.10 |
| 0.044 | 31.00 |
| 0.044 | 27.17 |
| 0.060 | 34.20 |
| 0.060 | 32.16 |
| 0.060 | 33.15 |
| 0.085 | 27.15 |
| 0.085 | 29.24 |
| 0.085 | 28.46 |
| Electrode No. 4 | |
| A | |
| 0.031 | 54.21 |
| 0.031 | 52.80 |
| 0.031 | 49.80 |
| 0.054 | 41.34 |
| 0.054 | 45.73 |
| 0.054 | 37.45 |
| 0.067 | 35.12 |
| 0.067 | 37.45 |
| 0.067 | 32.48 |
| 0.094 | 34.81 |
| 0.094 | 35.65 |
| 0.094 | 37.18 |
| 0.134 | 29.56 |
| 0.134 | 32.12 |
| 0.134 | 30.46 |
| B | |
| 0.030 | 58.56 |
| 0.030 | 57.80 |
| 0.030 | 59.42 |
| 0.052 | 61.8 |
| 0.052 | 41.33 |
| 0.052 | 40.79 |
| 0.067 | 37.2 |
| 0.067 | 26.93 |
| 0.092 | 36.29 |
| 0.092 | 36.53 |
| 0.092 | 36.18 |
| 0.131 | 35.77 |
| 0.131 | 36.53 |
| 0.131 | 34.30 |
| Electrode No. 5 | |
| A | |
| 0.049 | 34.52 |
| 0.049 | 36.10 |
| 0.049 | 33.62 |
| 0.061 | 45.15 |
| 0.061 | 38.37 |
| 0.061 | 32.80 |
| 0.061 | 32.23 |
| 0.086 | 26.72 |
| 0.086 | 29.90 |
| 0.086 | 26.63 |
| 0.086 | 24.63 |
| 0.123 | 26.07 |
| 0.123 | 24.30 |
| 0.123 | 23.70 |

TABLE II-continued

| Amps/gm | Utilization (%) |
|---|---|
| B | |
| 0.050 | 34.33 |
| 0.050 | 33.33 |
| 0.050 | 32.60 |
| 0.062 | 34.25 |
| 0.062 | 32.90 |
| 0.062 | 28.8 |
| 0.087 | 21.1 |
| 0.087 | 21.1 |
| 0.087 | 22.2 |
| 0.124 | 16.43 |
| 0.124 | 15.13 |
| 0.124 | 14.05 |
| Electrode No. 6 | |
| A | |
| 0.02360 | 36.91 |
| 0.02360 | 36.23 |
| 0.02360 | 35.86 |
| 0.02955 | 43.24 |
| 0.02955 | 41.66 |
| 0.02955 | 37.55 |
| 0.04137 | 32.17 |
| 0.04137 | 29.16 |
| 0.04137 | 31.56 |
| B | |
| 0.059 | 29.0 |
| 0.059 | 28.0 |
| 0.059 | 28.0 |
| 0.090 | 12.05 |
| 0.090 | 11.65 |
| 0.090 | 11.23 |

FIG. 1 is a least squares curve fit to straight lines for the data set forth in Table II. In FIG. 1, the numbered lines correspond to the least squares curve fit for the data for the electrode set in Table II. Thus the line numbered 1 corresponds to the Table II data for Electrode No. 1, electrodes A, B and C, et cetera.

It can be seen in FIG. 1 that the percent utilization of active material for positive plates that include glass microspheres, as a function of amps/gram of positive active material is comparable to or even higher than the percent utilization for conventional positive plates, that is those that do not include glass microspheres. The utilization of positive plates with glass microspheres can be many times the utilization of positive plates without glass bubbles particularly at the higher current densities (i.e., amps/gm). For example at 0.09 amps/gm the utilization of positive plates without glass bubbles was about 10% while the utilization for plates containing 20 gms of glass bubbles had a utilization of 40%. Moreover, the positive plates are lighter in weight than conventional plates because the lower density glass microspheres have been substituted for higher density active material that would otherwise be present in the plates but which would not enter into the electrochemical reaction. Further, the structural integrity of the plates of the present invention has not been compromised by the replacement of the unused higher density active material with glass microspheres.

EXAMPLE 2

This Example illustrates the effect that powdered lead glass has on the capacity of a negative plate during discharge.

In this Example lead glass manufactured by Corning Incorporated, and having a true density of 4.28 g/cc was ground to 325 mesh, and used in the fabrication of negative plates.

Negative Plate Fabrication

The negative plates were fabricated by first mixing the lead glass and Barton type oxide while both were dry. Approximately 100 cc of lead glass was added per pound of Barton type oxide. Next, for every pound of Barton oxide, 30 ml of distilled water, followed by 30 ml of 1.4 specific gravity sulfuric acid were mixed with the oxide. Enough water was added to the mixture to make it "pasteable." This amounted to 80 ml of water per pound of Barton oxide. The mixture was pasted into 0.067 inch thick lead-antimony grids. Eight plates were fabricated, as follows:

TABLE III

| wt. of Barton Oxide | 455.00 g |
|---|---|
| wt. of Expander | 4.54 |
| wt. of $H_2SO_4$ | 42.00 g |
| wt. of $H_2O$ | 80.00 g |
| wt. of Lead Glass (wtG) | 133.00 g |
| Total wt. of Paste (wtP) | 713.54 g |
| Measured density (p) | 3.27 g/cc |
| Total Volume (Vot = wtP/p) | 218.20 cc |
| True Density of Lead Glass (pG) | 4.28 g/cc |
| Volume of Lead Glass (VolG = wtG/pG) | 31.07 cc |
| Percent Lead Glass (100 * VolG/VolT) | 14.20% |

To simulate the hydroset curing process, the pasted plates were wrapped in wax paper and placed in an oven for 24 hours at 150° F. with no water.

Cell Fabrication

The cells were constructed such that the negative plate being tested would limit the capacity of the cell. Placing the negative plate between two positive plates ensured that the negative active mass had an excess of positive active mass with which to react. A flooded cell design was used with an excess of electrolyte so that a shortage of sulfate ions would not occur. The cell was filled with 1.10 specific gravity sulfuric acid for the initial formation charge. A total of three cells of this design were fabricated.

Formation Charge

The plates were formed with a constant current charge for 48 hours to 125% of the stoichiometric capacity of the two positive plates. This was done to ensure that the positive plates were fully formed. After the formation charge the acid was removed and replaced with new acid with a 1.30 specific gravity.

Determination of the Capacity

Three plates were cycled at various discharge rates. Plate Nos. 1 and 2 were cycled at discharge rates of 0.01, 0.025 and 0.05 amps of negative active mass per gram and Plate No. 3 was cycled at discharge rates of 0.015, 0.025, 0.035, and 0.05, amps per gram of negative active mass. The discharge was maintained at a constant current level until the standard cut-off voltage of 1.75 volts was reached. When the cut-off voltage was reached for each cell, the number of amp-hours removed from each cell was recorded, and compared to the theoretical capacity of the negative plate in the cell. The cells were charged at a constant current of 2 amps until a voltage of 2.45 V was reached. The voltage was then maintained at 2.45 V until 100% of the previous discharge was returned. Distilled water was added if the cells had a low electrolyte level. The results of the capacity test are set forth in Table IV, where the utilization is recorded to the nearest unit.

TABLE IV

Plate No. 1

| Amps 1 gm | Utilization (%) |
|---|---|
| 0.01 | 39 |
| 0.01 | 41 |
| 0.01 | 48 |
| 0.01 | 55 |
| 0.01 | 57 |
| 0.01 | 64 |
| 0.025 | 53 |
| 0.025 | 57 |
| 0.025 | 69 |
| 0.025 | 71 |
| 0.05 | 60 |

Plate No. 2

| Amps/gm | Utilization (%) |
|---|---|
| 0.01 | 26 |
| 0.01 | 29 |
| 0.01 | 35 |
| 0.01 | 36 |
| 0.01 | 42 |
| 0.01 | |
| 0.025 | 31 |
| 0.025 | 52 |
| 0.025 | 65 |
| 0.025 | 71 |
| 0.05 | 40 |

Plate No. 3

| Amps/gm | Utilization (%) |
|---|---|
| 0.015 | 47 |
| 0.015 | 59 |
| 0.015 | 86 |
| 0.025 | 64 |
| 0.025 | 66 |
| 0.025 | 88 |
| 0.025 | 91 |
| 0.035 | 47 |
| 0.035 | 54 |
| 0.035 | 70 |
| 0.05 | 44 |

From the above cycling data and examination of the plates with a Scanning Electron Microscope (SEM) this Example shows that discharging of the lead acid battery will react the lead atoms or the lead oxide molecules in the lead glass particles. The amount that reacts from the particle appears to depend upon the cycling regime. Plate 1 and Plate 3 did not react the glass particles to the same condition and the plates were not cycled the same.

The lead from the lead glass reacts during cycling and thus provides a reactive surface to improve conductivity and cohesion to the active material. Accordingly, the addition of a stable conductive particle to the active mass increases the performance of the active mass. The addition of a conductive medium helps provide pathways for the electrons to leave the active mass during both the discharge and the charge cycle, thereby increasing the capacity of the battery, and possibly increasing charging efficiency.

We claim:

1. An electrode for a lead-acid battery comprising a current collector and active material carried by said current collector, said active material having a filler selected from the group consisting of a conductive filler and a mixture of conductive and non-conductive fillers, said filler being included in said active material such that the utilization of active material in said electrode is greater than 35% at the one hour rate.

2. The electrode of claim 1 wherein said filler is a conductive hollow glass microsphere.

3. The electrode of claim 2 wherein said hollow glass microspheres are hollow lead glass microspheres.

4. The electrode of claim 1 wherein said filler is a mixture of conductive and non-conductive fillers, said non-conductive filler is hollow glass microspheres, and said conductive filler is a member selected from the group consisting of hollow lead glass microspheres, graphite, graphite fibers, titanium oxide and stannic oxide.

5. The electrode of claim 2 wherein said conductive hollow glass microspheres are coated with a conductive medium, and said conductive medium is selected from the group consisting of lead, zinc, tin, gold, cobalt, tantalum, uranium, platinum, zirconium, titanium, tellurium, nickel, hafnium, niobium, tungsten, chromium, magnesium and electrically conductive metal oxides and electrically conductive metal alloys.

6. The electrode of claim 5 wherein said electrically conductive metal oxide is an oxide selected from the group consisting of titanium oxide, zirconium oxide, lead oxide and tin oxide.

7. An electrode for a lead-acid battery comprising a current collector and active material carried by said current collector, said active material having included therein hollow lead glass microspheres.

8. An electrode for a lead-acid battery comprising a current collector and active material carried by said current collector, said active material having hollow glass microspheres in an amount of from about 10 to about 50% by volume and graphite fibers in an amount of from about 15 to about 65% by volume included therein.

9. A lead-acid electrochemical cell comprising at least one positive electrode, at least one negative electrode, a separator disposed between said positive electrode and said negative electrode, at least one of said positive electrode and said negative electrode comprising a current collector and active material carried by said current collector, said active material having a filler selected from the group consisting of conductive fillers and a mixture of conductive and non-conductive fillers, said filler being included in said active material such that the utilization of active material in said electrode is greater than 35% at the one hour rate.

10. The electrochemical cell of claim 9 wherein said filler is conductive hollow glass microspheres.

11. The electrochemical cell of claim 10 wherein said hollow glass microspheres are hollow lead glass microspheres.

12. The electrochemical cell of claim 9 wherein said filler is a mixture of conductive and non-conductive fillers, said non-conductive filler is hollow glass microspheres and said conductive filler is a member selected from the group consisting of hollow lead glass microspheres graphite, graphite fibers, titanium oxide and stannic oxide.

13. The electrochemical cell of claim 10 wherein conductive hollow glass microspheres are coated with a conductive medium, and said conductive medium is selected from the group consisting of lead, zinc, tin, gold, cobalt, tantalum, uranium, platinum, zirconium, titanium, tellurium, nickel, hafnium, niobium, tungsten, chromium, magnesium and electrically conductive metal oxides and electrically conductive metal alloys.

14. The electrochemical cell of claim 13 wherein said electrically conductive metal oxide is an oxide selected from the group consisting of titanium oxide, zirconium oxide, lead oxide and tin oxide.

15. A lead-acid battery comprising at least one positive electrode, at least one negative electrode, a separator disposed between said positive electrode and said negative electrode, at least one of said positive electrode and said negative electrode comprising a current collector and active material carried by said current collector, said active material having a filler selected from the group consisting of a conductive filler and a mixture of conductive and non-conductive fillers, said filler being included in said active material such that the utilization of active material in said electrode is greater than 35% at the one hour rate.

16. The lead-acid battery of claim 15 wherein said filler is conductive hollow glass microspheres.

17. The lead-cell battery of claim 16 wherein said hollow glass microspheres are hollow lead glass microspheres.

18. The lead-acid battery of claim 15 wherein said filler is a mixture of conductive and non-conductive fillers, said non-conductive filler is hollow glass microspheres and said conductive filler is a member selected from the group consisting of hollow lead glass microspheres, graphite, graphite fibers, titanium oxide and stannic oxide.

19. The lead-acid battery of claim 16 wherein hollow glass microspheres are coated with a conductive medium, and said conductive medium is selected from the group consisting of lead, zinc, tin, gold, cobalt, tantalum, uranium, platinum, zirconium, titanium, tellurium, nickel, hafnium, niobium, tungsten, chromium, magnesium and electrically conductive metal oxides and electrically conductive metal alloys.

20. The lead-acid battery of claim 19 wherein said electrically conductive metal oxide is an oxide selected from the group consisting of titanium oxide, zirconium oxide, lead oxide and tin oxide.

21. The electrode of claim 1 wherein said active material forms multilayers, said multilayer active material comprising a first layer of active material having glass microspheres incorporated therein, and a second layer of active material having a concentration of glass microspheres of from zero to less than the glass microsphere concentration of said first layer.

22. The electrode of claim 21 wherein at least a portion of said glass microspheres incorporated in said first layer are conductive.

23. The electrode of claim 21 wherein at least a portion of said glass microspheres incorporated in said second layer are conductive.

24. The electrode of claim 21 wherein at least a portion of said glass microspheres in said first layer and at least a portion of said glass microspheres in said second layer conductive.

25. The electrochemical cell of claim 9 wherein said active material forms multilayers, said multilayer active material comprising a first layer of active material having glass microspheres incorporated therein, and a second layer of active material having a concentration of glass microspheres of from zero to less than the glass microsphere concentration of said first layer.

26. The electrochemical cell of claim 25 wherein at least a portion of said glass microspheres incorporated in said first layer are conductive.

27. The electrochemical cell of claim 25 wherein at least a portion of said glass microspheres incorporated in said second layer are conductive.

28. The electrochemical cell of claim 25 wherein at least a portion of said glass microspheres in said first layer and at least a portion of said glass microspheres in said second layer are conductive.

29. The lead-acid battery of claim 15 wherein said active material forms multilayers, said multilayer active material comprising a first layer of active material having glass microspheres incorporated therein, and a second layer of active material having a concentration of glass microspheres of from zero to less than the glass microsphere concentration of said first layer.

30. The lead-acid battery of claim 29 wherein at least a portion of said glass microspheres incorporated in said first layer are conductive.

31. The lead-acid battery of claim 29 wherein at least a portion of said glass microspheres incorporated in said second layer are conductive.

32. The lead-acid battery of claim 29 wherein at least a portion of said glass microspheres in said first layer and at least a portion of said glass microspheres in said second layer are conductive.

33. The electrode of claim 1 wherein said non-conductive filler comprises an anion exchange resin.

* * * * *